(12) United States Patent
Kovermann et al.

(10) Patent No.: US 11,813,689 B2
(45) Date of Patent: Nov. 14, 2023

(54) METHOD FOR PRODUCING A SOLDER DEPOSIT, AND SOLDER DEPOSIT

(71) Applicant: KME Germany GmbH, Osnabrück (DE)

(72) Inventors: Marc Kovermann, Hagen (DE); Ralph Närdemann, Nordkirchen (DE)

(73) Assignee: KME Germany GmbH, Osnabrück (DE)

( * ) Notice: Subject to any disclaimer, the term of this patent is extended or adjusted under 35 U.S.C. 154(b) by 0 days.

(21) Appl. No.: 17/776,463

(22) PCT Filed: Dec. 15, 2020

(86) PCT No.: PCT/DE2020/101065
§ 371 (c)(1),
(2) Date: May 12, 2022

(87) PCT Pub. No.: WO2021/121480
PCT Pub. Date: Jun. 24, 2021

(65) Prior Publication Data
US 2022/0402059 A1    Dec. 22, 2022

(30) Foreign Application Priority Data

Dec. 17, 2019    (DE) ............... 10 2019 134 680.0

(51) Int. Cl.
*B23K 1/20* (2006.01)
*B21C 23/18* (2006.01)
(Continued)

(52) U.S. Cl.
CPC .............. *B23K 1/20* (2013.01); *B21C 23/186* (2013.01); *B21D 22/04* (2013.01); *B23K 3/08* (2013.01);
(Continued)

(58) Field of Classification Search
CPC ......... B23K 1/20; B21C 23/183; B21C 23/20; B21C 23/14; B21C 23/186; B21D 35/001;
(Continued)

(56) References Cited

U.S. PATENT DOCUMENTS 5,169,054 A * 12/1992 Matsui ................. H02K 41/025
228/136
6,371,357 B1 * 4/2002 Watanabe ........... F27D 99/0073
219/390
(Continued)

FOREIGN PATENT DOCUMENTS

DE    195 12 089    10/1996
DE    197 29 967    1/1999
(Continued)

OTHER PUBLICATIONS

International Search Report dated Jul. 5, 2021 by the European Patent Office in International Application PCT/DE2020/101065.

*Primary Examiner* — Debra M Sullivan
*Assistant Examiner* — Matthew Stephens
(74) *Attorney, Agent, or Firm* — Henry M. Feiereisen LLC

(57) ABSTRACT in a method for producing a solder deposit in a metal sheet, a depression is made in a topside of the metal sheet through deep drawing, thereby causing material to protrude on a bottom side of the metal sheet. The metal sheet is then subjected to a material forming process to produce a collar such that the collar projects in relation to the topside. The collar is then at least partially pressed in a direction of the depression to reduce a cross-sectional area of a mouth of the depression, and the protruding material on the bottom side (Continued)

is completely pushed back so that the bottom side in a region of the depression is in one plane with neighboring regions of the bottom side.

4 Claims, 3 Drawing Sheets

(51) Int. Cl.
*B21D 22/04* (2006.01)
*B23K 3/08* (2006.01)
*B23K 31/02* (2006.01)
*B23K 33/00* (2006.01)
*B23K 101/18* (2006.01)

(52) U.S. Cl.
CPC .............. *B23K 31/02* (2013.01); *B23K 33/00* (2013.01); *B23K 2101/18* (2018.08)

(58) Field of Classification Search
CPC .... B21D 35/002; B21D 35/003; B21D 22/02; B21D 22/04; B21D 22/30; B21D 1/06; B21D 1/065; B21D 1/08; B21J 5/008; B21J 9/022; B23P 23/02

USPC ....... 228/15.1, 135–137, 173.1, 173.2, 173.6
See application file for complete search history.

(56) References Cited

U.S. PATENT DOCUMENTS

| 6,749,103 | B1 * | 6/2004 | Ivanov | C23C 14/3407 228/171 |
| 8,702,919 | B2 * | 4/2014 | Ferrasse | H01J 37/3426 228/115 |
| 2004/0079634 | A1 * | 4/2004 | Wickersham, Jr. | B21K 25/00 228/136 |
| 2017/0209909 | A1 * | 7/2017 | Kavik | B21C 3/06 219/390 |
| 2017/0261869 | A1 * | 9/2017 | Haruyama | G03G 5/04 228/136 |

FOREIGN PATENT DOCUMENTS

| DE | 102011056462 | 6/2013 |
| DE | 102014101695 | 8/2015 |
| DE | 102017208676 | 11/2018 |

* cited by examiner

METHOD FOR PRODUCING A SOLDER DEPOSIT, AND SOLDER DEPOSIT

CROSS-REFERENCES TO RELATED APPLICATIONS

This application is the U.S. National Stage of International Application No. PCT/DE 2020/101065, filed Dec. 15, 2020, which designated the United States and has been published as International Publication No. WO 2021/121480 A2 and which claims the priority of German Patent Application, Serial No. 10 2019 134 680.0, filed Dec. 17, 2019, pursuant to 35 U.S.C. 119(a)-(d).

BACKGROUND OF THE INVENTION

The invention relates to a method for the production of a solder deposit in a metal sheet.

A plurality of components, in particular stamped and contact components, are soldered to other components, as encountered very frequently in the automotive industry. These other components to which stamped and contact components are to be attached are located, e.g., on car windows. In the windshield heating application field, e.g. stamped and contact parts including cables and sensors are soldered. The solder is applied to the stamped and contact parts in so-called solder pads in platelet form and briefly heated so as to establish a material joint.

During transport or as a result of vibrations, the solder platelets can become loose or even fall off, making further processing of the stamped or contact part impossible.

The invention is based on the object to provide a method for the production of a solder deposit in a metal sheet, which method enables to attach a solder captive on the metal sheet. Furthermore, a solder deposit having these properties is to be provided.

SUMMARY OF THE INVENTION method as set forth hereinafter attains the object, as does a solder deposit as set forth hereinafter and produced by this method.

The method according to the invention provides that a metal sheet having a topside and a bottom side is provided in a first step with a depression in the topside through deep drawing. The terms topside and bottom side are only representative of the opposite sides of the metal sheet. They are interchangeable. The metal sheet may involve in particular a stamped part or a contact part. The metal sheet does not necessarily have to be flat overall. It can also have curved or shaped regions. Solder deposits can be attached on the topside and/or on the bottom side.

The depression is produced through tensile compression shaping by displacing part of the material from the topside toward the bottom side through chipless forming so that the displaced material protrudes in relation to the bottom side. A protrusion is formed. Deep drawing is comparable to embossing, with the embossed structure being formed on the opposite side of the metal sheet. Deep drawing is carried out in particular by means of forming tools, i.e. by means of a punch and a counterholder. The use of other active media, like e.g. gases or liquids, is also possible, as is deep drawing with active energies, like e.g. using magnetic shaping.

Deep drawing produces a depression on the side on which an active medium or the forming tool is applied, and a projection on the other side. However, the flash moved by deep drawing is not punched out. There is no opening or through-hole in the metal sheet, but only a deep embossment.

In the next step, a collar is formed on the depression. The material protruding from the bottom side as a result of deep drawing is pushed again in the opposite direction, i.e. back in direction towards the topside. The pressing may be executed from the topside and/or the bottom side. In the meantime, a punch is located in the depression, so that the depression can no longer be completely filled. Rather, the compressed material should flow sideways past the punch. In this way, a collar is produced which surrounds the punch and the depression that receives the punch.

In the next step, the punch is removed from the depression. The collar is then at least partially compressed in the direction of the depression. As a result, the cross-sectional area of a mouth of the depression is reduced. An undercut depression is created. This undercut depression forms a fastening option for a solder, which can be pressed into this depression or can be anchored captive in this undercut depression. The geometry enables the solder to be held securely even when the metal sheet is shaken, e.g. during transport or handling. The form fit of the solder in the solder deposit precludes a loss of the solder. In any case, further processing by soldering is possible.

The method according to the invention preferably provides that the material protruding from the bottom side as a result of deep drawing is completely pushed back so that the bottom side in the region of the depression is in one plane with neighboring regions of the bottom side. In other words, the bottom side is smoothed. Preferably, the topside is also smoothed by completely pushing back the collar so that it does not protrude beyond the topside. In this way, for certain applications, the required evenness of the metal sheet can also be achieved in the area of the solder deposit. Smoothing can be carried out in a pressing tool, for example also by rolling. As a result, the topside and the bottom side are free of protrusions due to the production of the depression.

It is possible with the method according to the invention to produce several solder deposits simultaneously on one side or alternately on one and the same metal sheet, in particular when relatively soft materials are involved.

The invention further relates to a solder deposit which has been produced in a metal sheet by the method according to one of the claims explained above. The solder deposit is hereby formed by an undercut depression in a topside of the metal sheet. In particular, a cross-sectional area of the depression may increase continuously from a topside to a bottom of the depression. The increase may be uniform or irregular. Preferably, the increase in the cross-sectional area is uniform. In this case, the depression of the solder deposit has a dovetail-shaped cross-section. The narrowing on the mouth side of the in particular circular diameter of the solder deposit makes it possible to introduce a suitable solder behind the mouth and thus to store it formfittingly and captive on the metal sheet for further processing.

The solder deposit further has the advantage of increasing the surface area in the region of the solder to be melted, contributing in turn to an improved solder joint.

BRIEF DESCRIPTION OF THE DRAWING

The invention is explained hereinafter with reference to an exemplary embodiment shown in the drawings. It is shown in.

DETAILED DESCRIPTION OF PREFERRED EMBODIMENTS

Figure 1:
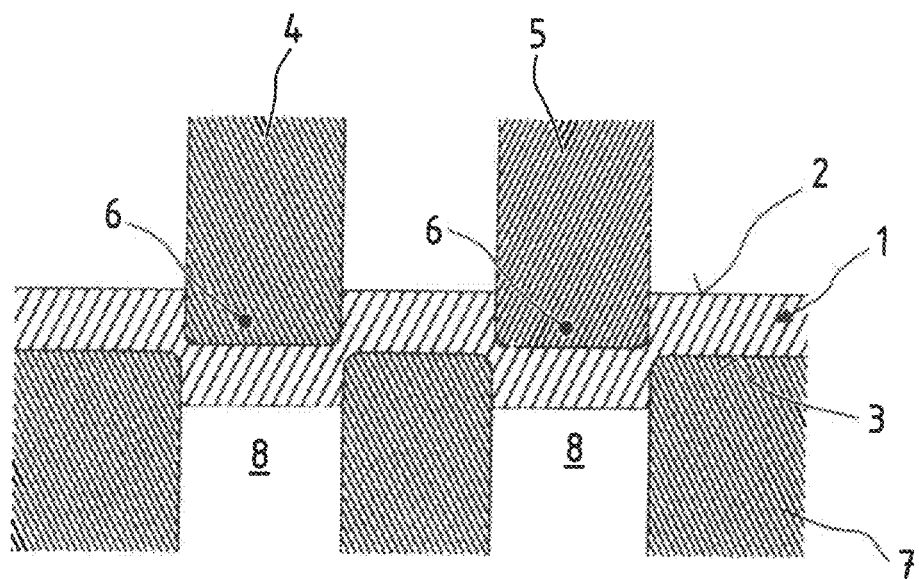
FIG. 1 a cross-section of a metal sheet during a first manufacturing step.

FIG. 1 shows a metal sheet 1 with a topside 2 and with a bottom side 3. The metal sheet 1 is located in a pressing tool. Two punches 4, 5 serve as upper tool and are moved against the topside 2 of the metal sheet 1 so that identical depressions 6 are created in the metal sheet 1. The displaced material is displaced in the direction of the bottom side 3. For this purpose, recesses 8 are located in the lower tool 7 to match the cross-sectional area of the punches 4, 5. The punches 4, 5 or the recesses 8 in the lower tool 7 are preferably circular in cross-section.

Figure 2:
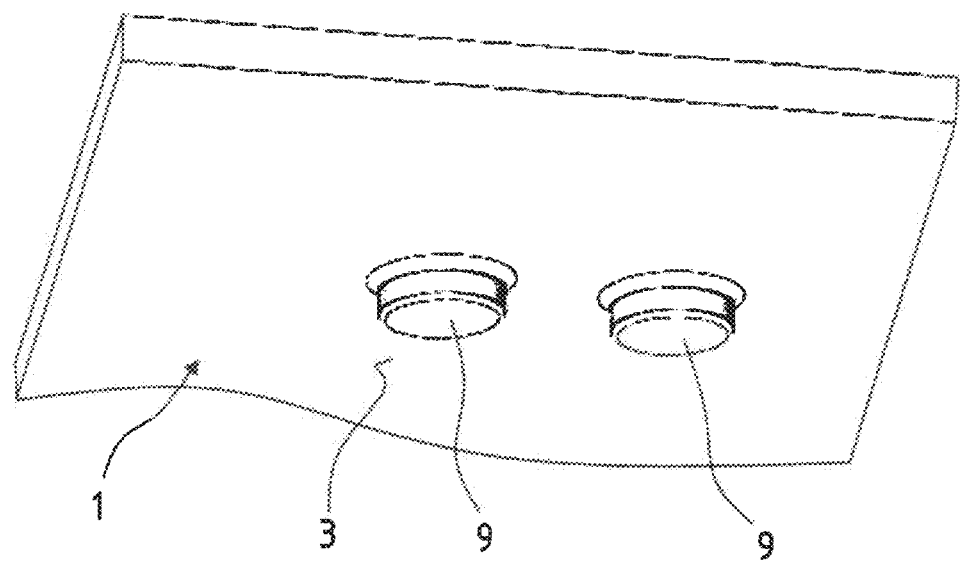
FIG. 2 the metal sheet after the first manufacturing step in the direction of view of the bottom side.
Figure 3:
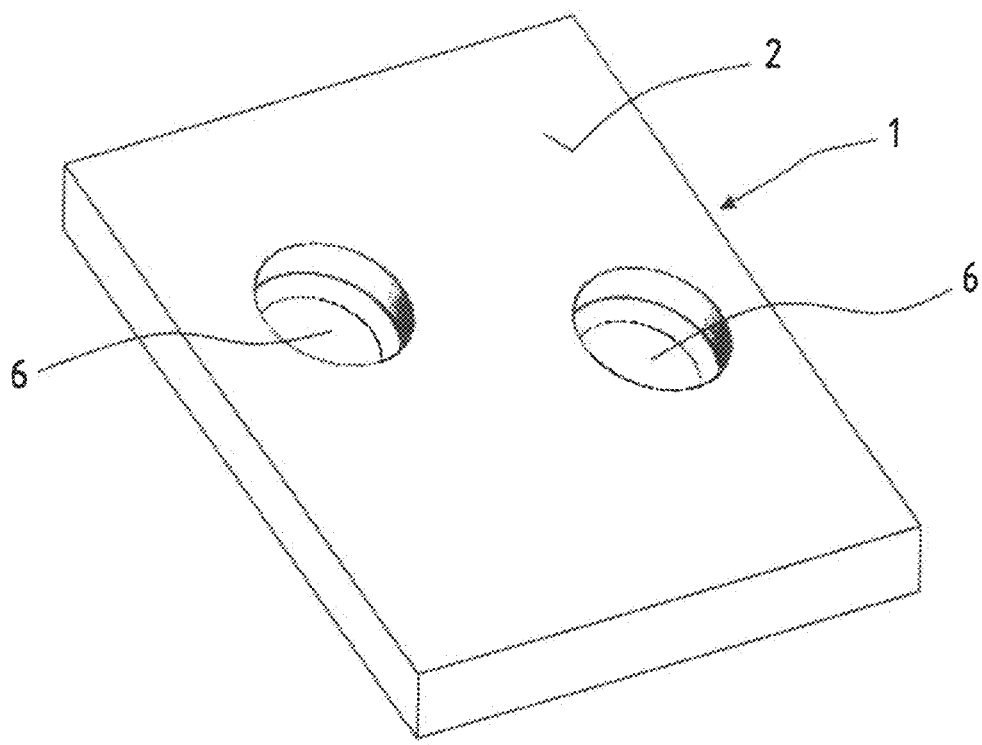
FIG. 3 the metal sheet of FIG. 2 viewed in the direction of the topside.

It is apparent that the projections formed through material displacement during deep drawing are not separated from the metal sheet 1, but remain connected to the metal sheet 1 via a narrow web. FIG. 2 shows the bottom side 3 of the metal sheet 1 in the direction of view of the projections 9 which are formed through deep drawing and have a substantially cylindrical cross-section. FIG. 3 shows the metal sheet 1 in the direction of view of its topside 2. The two depressions 6 have a cylindrical shape.

Figure 4:
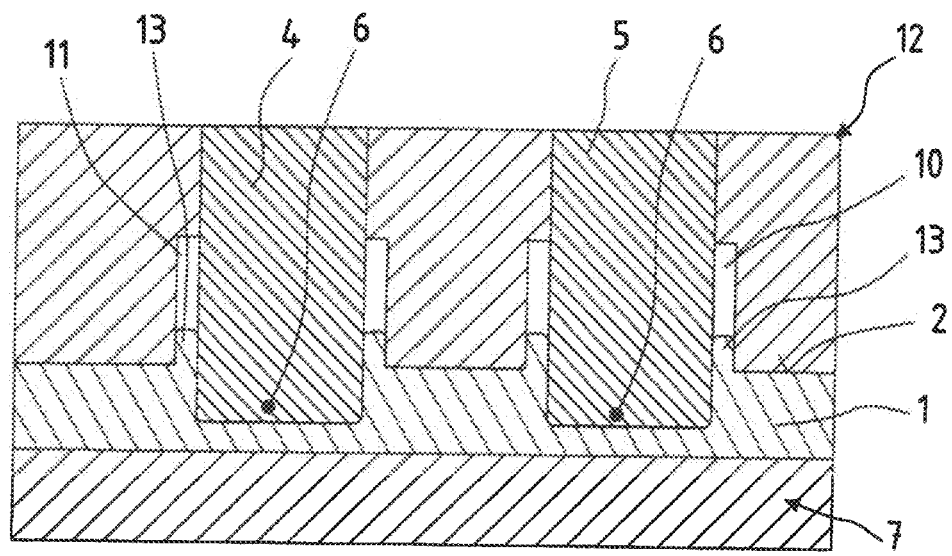
FIG. 4 the metal sheet of FIG. 3 during the next manufacturing step.

In the next manufacturing step, the projections 9 that protrude with respect to the bottom side 3 are pushed back. For this purpose, the metal sheet 1 is inserted into a further forming tool according to the schematic illustration of FIG. 4. The punches 4, 5 there engage in the depressions 6 of the metal sheet and fill them. At the same time, the punches 4, 5 are surrounded by mold cavities 10, 11 adjacent to the topside 2 of the metal sheet 1. This exemplary embodiment involves ring-shaped mold cavities 10, 11 which are traversed by the respective punch 4, 5 in the longitudinal direction. In the invention, either the lower tool 7 can level the projections 9 to such an extent that material of the metal sheet flows into the mold cavities 10, 11. As an alternative or in addition, the upper tool 12 may be lowered in relation to the punches 4, 5 so that material flows backwards into the mold cavities 10, 11 in opposition to the movement of the upper tool 12.

Figure 5:
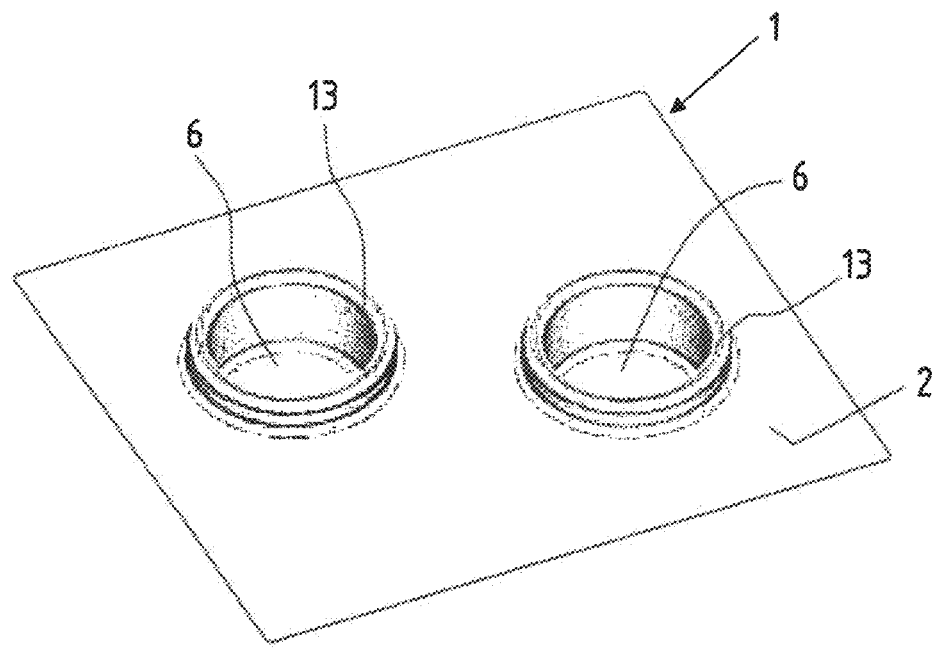
FIG. 5 the metal sheet after completion of the manufacturing step of FIG. 4 as viewed in the direction of its topside.
Figure 6:
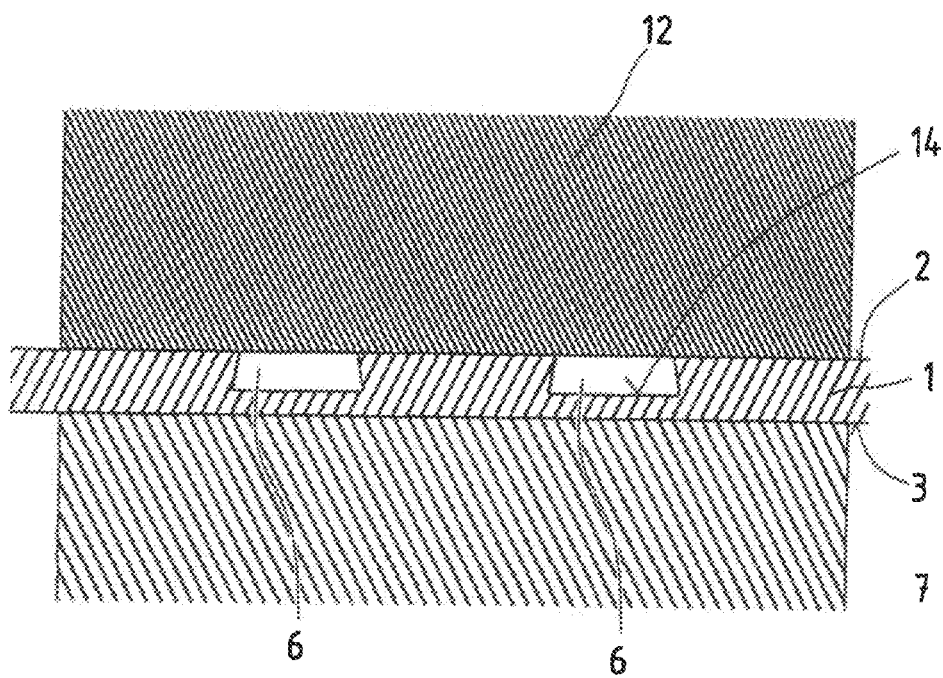
FIG. 6 the metal sheet of FIG. 5 during a final manufacturing step.

Regardless of whether the lower tool 7, the upper tool 12 or at the same time the punches 4, 5 are actuated, a collar 13 is formed around the periphery of the punches 4, 5, as can be seen in particular in the plan view of the topside 2 according to FIG. 5. The collar 13 does not constrict the cross-section of the depressions 6 in the topside 2. The depressions 6 still have walls that are substantially perpendicular to the topside 2 or to the metal sheet 1.

The orientation of the lateral walls is changed in a final manufacturing step. The metal sheet 1 is once again placed between an upper tool 12 and a lower tool 7 so that the topside 2 and the bottom side 3 are completely smoothed by pressing. The material of the collar 13 is here displaced in the direction of the depression 6, so that the depression 6 obtains a dovetail-shaped cross-section. As a result, the depression 6 is undercut. The cross-sectional area of the depression 6 increases continuously from the topside 2 toward a bottom 14 of the depression 6.

In a final step, a solder can be introduced into such a depression 6 and is melted in a further manufacturing step in order to connect the metal sheet 1 to further components. The solder can be cast in or also pressed in so as to be formfittingly anchored to the metal sheet, before the metal sheet 1 is further processed, in particular transported.

The Figures show by way of example an application with two identically configured solder deposits. The solder deposits can be present at a greater number as well as on opposite sides. Several soldering deposits can also have different shapes in their cross-section.

What is claimed is:

1. A method for producing a depression in a metal sheet forming a captive receptacle for a solder deposit, said method comprising:
    forming a depression in a topside of the metal sheet with a first upper tool having a punch, thereby causing material to protrude into a recess of a first lower tool disposed on a bottom side of the metal sheet, with the recess of the first lower tool matching a cross-sectional area of the punch;
    subsequently subjecting the metal sheet to a material forming process by holding the metal sheet with the formed depression between a second lower tool having a substantially flat surface confronting the bottom side of the metal sheet and a second upper tool confronting the topside of the metal sheet and constructed to leave a mold cavity proximate to the topside between the punch and the second upper tool, and pressing the second upper tool against the second lower tool to flatten the bottom side, while maintaining the depression, and producing a collar projecting from the topside into the mold cavity;
    removing the first upper tool and the second upper tool, and at least partially pressing the collar in a direction of the depression to reduce a cross-sectional area of a mouth of the depression and to form the captive receptacle.

2. The method of claim 1, further comprising pushing back the collar so that the collar does not project beyond the topside.

3. The method of claim 1, further comprising smoothing the topside of the metal sheet in a pressing device after pressing the collar so as to remove any protrusion on the topside.

4. The method of claim 1, further comprising producing a plurality of said depression simultaneously in the topside of the metal sheet.

* * * * *